United States Patent
Zeng

(10) Patent No.: US 7,181,823 B2
(45) Date of Patent: Feb. 27, 2007

(54) METHOD FOR MANUFACTURING INTEGRATED BICYCLE CRANK ARM AND SPIDER ASSEMBLY AND THE CRANK ARM AND SPIDER ASSEMBLY MADE THEREBY

(76) Inventor: Jie Dong Zeng, 78-6, Lane 240, Lee-Mei Rd., Chang-Hui City, Chang-Hai Hsien (TW)

( * ) Notice: Subject to any disclaimer, the term of this patent is extended or adjusted under 35 U.S.C. 154(b) by 431 days.

(21) Appl. No.: 10/658,243

(22) Filed: Sep. 9, 2003

(65) Prior Publication Data
US 2005/0050986 A1  Mar. 10, 2005

(51) Int. Cl.
*B23P 17/00*  (2006.01)
*G05G 1/14*  (2006.01)

(52) U.S. Cl. .................. 29/530; 29/897.2; 29/888.08; 74/594.1; 72/356

(58) Field of Classification Search .......... 29/897, 29/897.2, 530, 6.01, 888.08; 74/594.1; 72/356
See application file for complete search history.

(56) References Cited

U.S. PATENT DOCUMENTS

| | | | |
|---|---|---|---|
| 6,145,184 A * | 11/2000 | Yamanaka | 29/527.6 |
| 6,178,631 B1 * | 1/2001 | Tanabe et al. | 29/857 |
| 6,266,990 B1 * | 7/2001 | Shook et al. | 72/256 |
| 6,401,511 B1 * | 6/2002 | Leng | 72/356 |
| 6,508,002 B1 * | 1/2003 | Chiang | 29/897.2 |
| 6,612,033 B1 * | 9/2003 | Jiang | 29/897.2 |
| 2003/0226422 A1 * | 12/2003 | Valle et al. | 74/594.1 |

FOREIGN PATENT DOCUMENTS

| TW | 499380 | * | 8/2002 |
|---|---|---|---|
| TW | 500679 | * | 9/2002 |
| TW | 548158 | * | 8/2003 |

* cited by examiner

*Primary Examiner*—Eric Compton

(57) ABSTRACT

A method for manufacturing a crank arm and spider assembly includes the following steps: (1) providing a blank; (2) shaping the blank to form a crank billet comprising an elongate body having a first end on which a spider is integrally formed and an opposite end having an expanded outside diameter; (3) forming a channel substantially co-extensive with the elongate body with an opening at the second end of the body; (4) reducing the expanded second end and thereby reducing inside diameter of the channel in proximity of the second for forming an entry of the channel; (5) filling a liquid into the channel through the entry and then sealing the entry; (6) placing the crank billet with the liquid filled in the channel into a mold and performing a mold forging operation to obtain a semi-product; and (7) forming a hole in the body to release the filling liquid out of the channel of the crank. Also disclosed is a one-piece bicycle crank arm and spider assembly comprised of an elongate crank body in which a channel is formed, the crank body having a first end on which a spider is integrally formed as one piece and an opposite second end defining a hole.

1 Claim, 5 Drawing Sheets

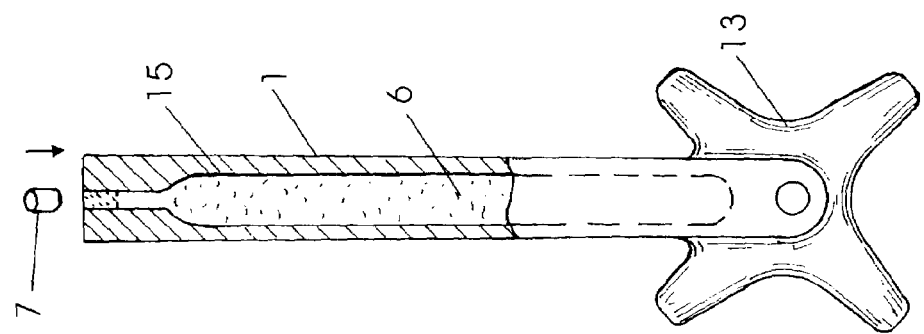
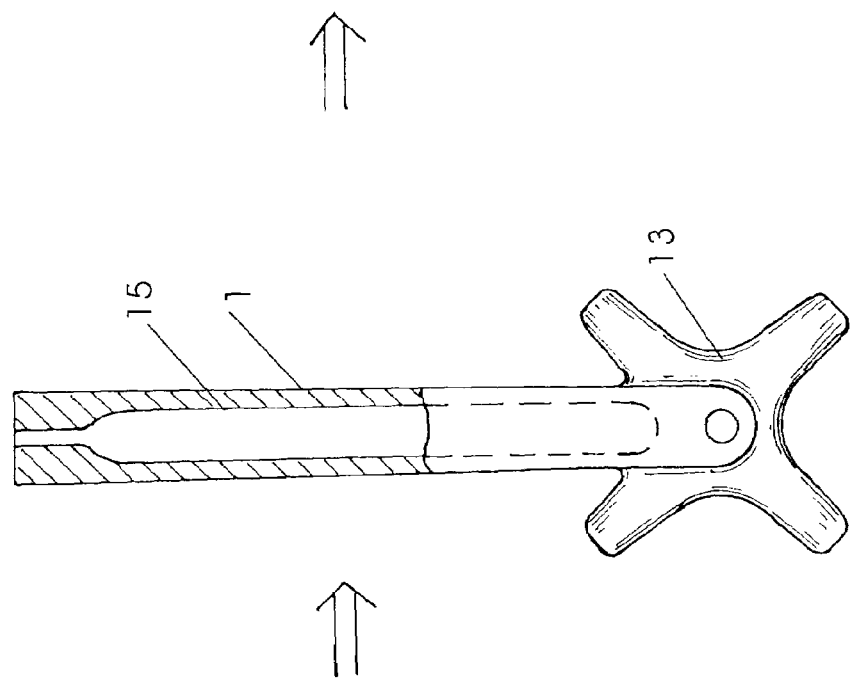
Fig. 6
Fig. 7

METHOD FOR MANUFACTURING INTEGRATED BICYCLE CRANK ARM AND SPIDER ASSEMBLY AND THE CRANK ARM AND SPIDER ASSEMBLY MADE THEREBY

BACKGROUND OF THE INVENTION

1. Field of the Invention

The present invention relates generally to a bicycle crank arm, and in particular to a method for readily and efficiently manufacturing a one-piece crank arm and spider assembly having enhanced surface appearance.

2. The Related Art

Being lightweight is one of the most important concerns in the bicycle industry. A number of bicycle parts are made hollow for reducing the overall weight of the bicycle. This is true of bicycle crank arm as well. Bicycle crank arms having a hollow body are known. However, the manufacturing process for such hollow crank arms is complicated, making it difficult and expensive to manufacture the crank arms. In addition, a spider that holds a sprocket must be mounted to the crank arm in a separate process by riveting or other known techniques after the manufacturing of the crank arm. Thus, the manufacturing time is substantially increased and the overall strength of the crank arm is adversely affected.

Further, the crank arms made by the conventional process may have a bad looking appearance. This makes the final product of bicycle not appealing to the general consumers.

It is thus desired to have a method for manufacturing bicycle crank arms without the above noted drawbacks.

SUMMARY OF THE INVENTION

An object of the present invention is to provide a method for manufacturing a one-piece bicycle crank arm and spider assembly.

Another object of the present invention is to provide a method for readily and efficiently manufacturing a one-piece bicycle crank arm and spider assembly.

A further object of the present invention is to provide a method for manufacturing an integral crank arm and spider assembly with low costs.

Yet a further object of the present invention is to provide a one-piece crank arm and spider assembly with enhanced appearance, lightweight, excellent mechanical strength and low costs.

To achieve the above objects, in accordance with the present invention, there is provided a method for manufacturing a crank arm and spider assembly comprising the following steps: (1) providing a blank; (2) shaping the blank to form a crank billet comprising an elongate body having a first end on which a spider is integrally formed and an opposite end having an expanded outside diameter; (3) forming a channel substantially co-extensive with the elongate body with an opening at the second end of the body; (4) reducing the expanded second end and thereby reducing inside diameter of the channel in proximity of the second for forming an entry of the channel; (5) filling a liquid into the channel through the entry and then sealing the entry; (6) placing the crank billet with the liquid filled in the channel into a mold and performing a mold forging operation to obtain a semi-product; and (7) forming a hole in the body to release the filling liquid out of the channel of the crank. Also disclosed is a one-piece bicycle crank arm and spider assembly comprised of an elongate crank body in which a channel is formed, the crank body having a first end on which a spider is integrally formed as one piece and an opposite second end defining a hole.

BRIEF DESCRIPTION OF THE DRAWINGS

The present invention will be apparent to those skilled in the art by reading the following description of the best mode for carrying out the present invention, with reference to the attached drawings, in which:

FIG. 6 is a schematic view of the crank billet after the end reduced to form a narrow entry for liquid filler;

FIG. 7 is a schematic view of the crank billet with the liquid filled in the bore thereof and sealed by a stop;

DETAILED DESCRIPTION OF THE BEST MODE FOR CARRYING THE PRESENT INVENTION

Figure 9:
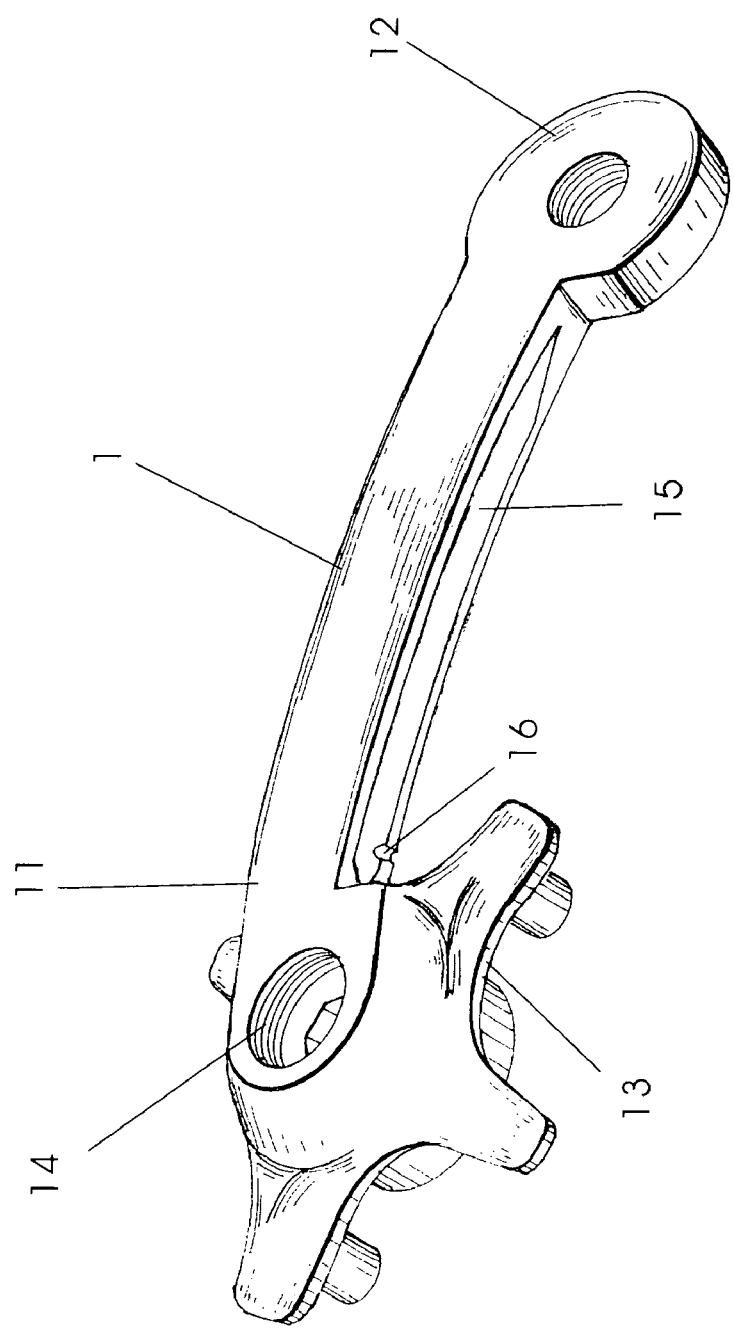
FIG. 9 is a perspective view of the integral crank arm and spider assembly manufactured by the method of the present invention.

With reference to the drawings and in particular to FIG. 9, an integral bicycle crank arm and spider assembly in accordance with the present invention comprises an elongate body 1 having a first end 11 and an opposite second end 12. A spider 13 is integrally formed on the first end 11 of the crank body 1. A spindle attached hole 14 is defined through the first end 11 and the spider 13 for receiving and retaining a spindle (not shown). The second end 12 of the crank body 1 forms a pedal attaching hole (not labeled) for retaining a pedal (not shown) thereon. To reduce the weight while maintaining mechanical strength, the elongate body 1 of the crank arm and spider assembly is made hollow, forming an internal channel 15.

Figure 1:
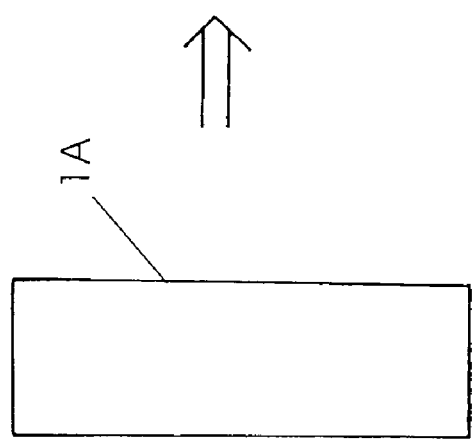
FIG. 1 is a schematic view showing a blank for making a crank arm and spider assembly in accordance with the present invention.

Also referring to FIGS. 1–8, to make the integral crank arm and spider assembly of the present invention, a metal blank IA is provided first, as shown in FIG. 1, and a mold forging operation is performed on the blank 1A to form a crank billet having an elongate body 1 and a spider 13 integrally formed on one end of the body 1. An opposite end of the body 1 of the crank billet is expanded in outside diameter.

Figure 3:
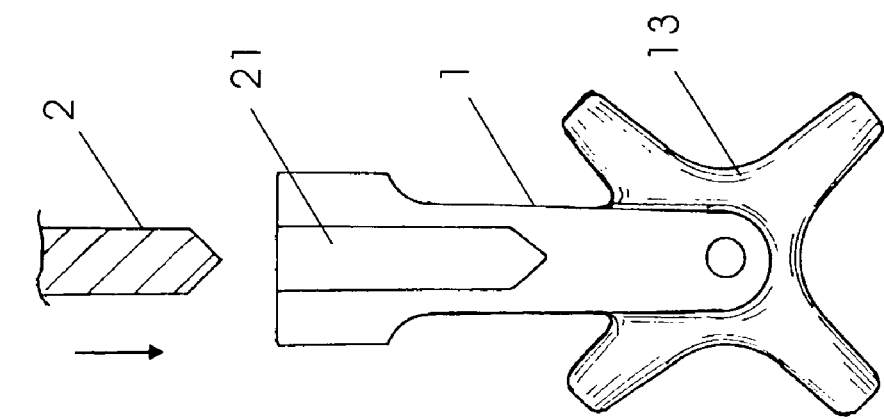
FIG. 3 is a schematic view showing the crank billet formed with a bore by drilling for making the crank arm and spider assembly of the present invention.
Figure 2:
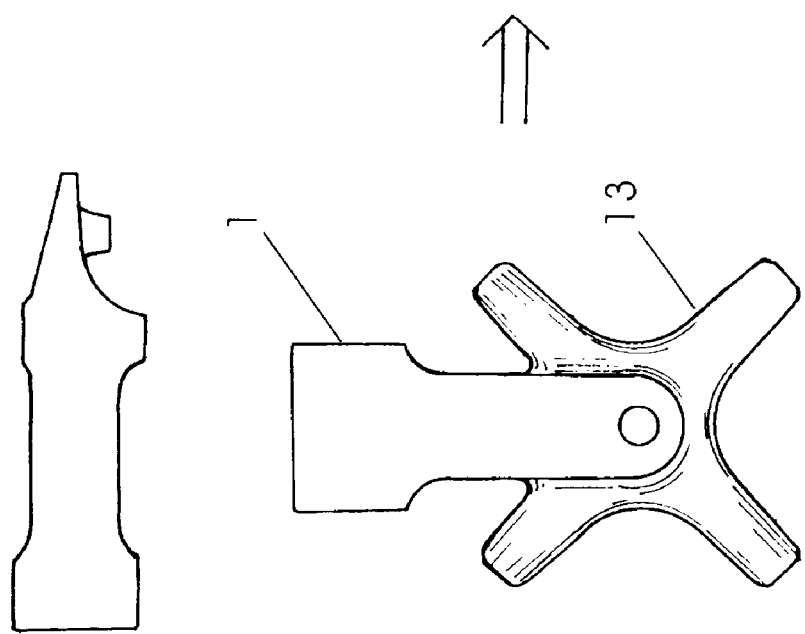
FIG. 2 is a schematic view showing a crank billet for making the crank arm and spider assembly of the present invention.

Thereafter, a drilling operation is performed by means of a drilling bit 2 to define a bore 21 in the expanded end and partially extending into the crank billet in an axial direction of the elongate body 1 of the crank billet, as illustrated in FIG. 3.

Figure 4:
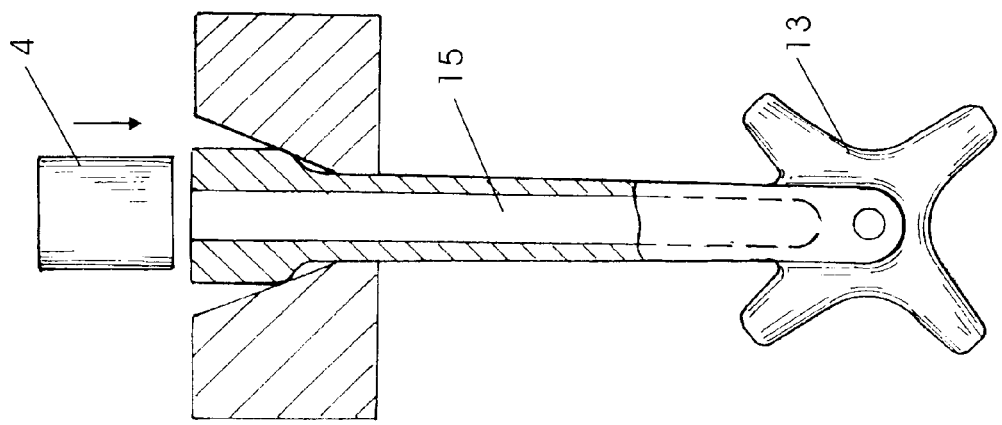
FIG. 4 is a schematic view showing the bore deepened by pressing.
Figure 5:
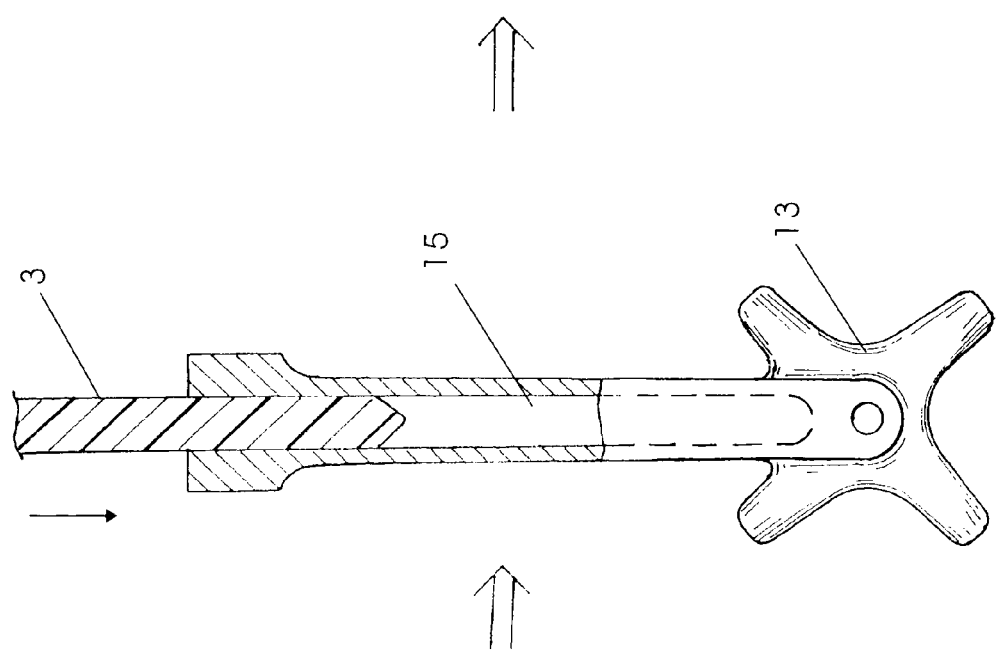
FIG. 5 is a schematic view showing an expanded end of the crank billet reduced by mold forging.
Figure 8:
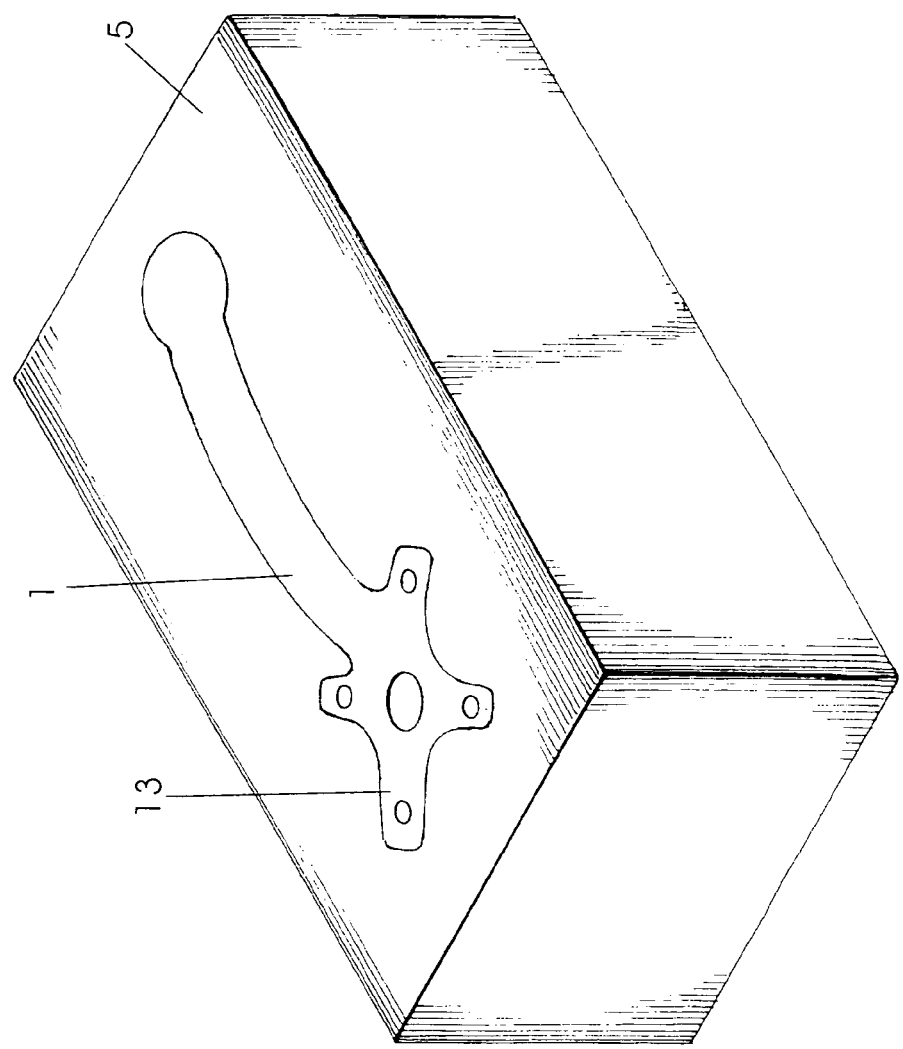
FIG. 8 is a perspective view showing the crank billet with liquid filled therein positioned in a forging die for final forging operation.

The bore 21 is then deepened by a pressing bit 3 as illustrated in FIG. 4 to define a channel 15 substantially co-extensive with the elongate body 1 of the billet and having a closed end in proximity of the spider end 13 and an open end at the second end 12. A die forging step is then performed by a forging tool 4 and an associated die (not labeled) as illustrated in FIG. 5 to reduce the outside diameter of the expanded end of the crank billet. As a consequence of the die forging operation, inside diameter of the channel 15 is reduced as illustrated in FIG. 6. The reduced inside diameter of the channel 15 thus forms an entry to the channel 15.

A liquid filler 6 is then filled into the channel 15 through the entry thereof as illustrated in FIG. 7. A stop 7 then seals the entry of the channel 15 to secure the liquid 6 inside the channel 15.

The crank billet with the liquid 6 filled in the channel 15 is placed in a forging mold 5 and a final forging operation is performed. The liquid filled in the channel 15 of the crank billet helps maintaining the cross-sectional shape of the crank during the final forging operation and also enhancing the surface of the final product.

A hole 16 (FIG. 9) is then formed by drilling in the elongate body 1 of the crank for releasing the liquid filler out of the channel 15 and the final product of the crank arm and spider assembly of the present invention as illustrated in FIG. 9 is obtained.

The crank arm and spider assembly so manufactured has at least the following advantages:

(1) The crank arm is a hollow member that reduces the overall weight while maintaining the desired mechanical strength. In addition, the spider and the crank arm are formed as an integral member, which further helps reducing weight and enhancing mechanical strength.

(2) The manufacturing process of the crank arm and spider assembly is substantially simplified with reduced costs.

(3) The liquid filler inside the crank billet during the manufacturing process helps enhancing surface and appearance of the final product.

Although the present invention has been described with reference to the best mode for carrying out the present invention, it is apparent to those skilled in the art that a variety of modifications and changes may be made without departing from the scope of the present invention which is intended to be defined by the appended claims.

What is claimed is:

1. A method for manufacturing a crank arm and spider assembly comprising the following steps:
   (1) providing a blank;
   (2) shaping the blank to form a crank billet comprising an elongate body having a first end on which a spider is integrally formed and an opposite end having an expanded outside diameter;
   (3) forming a channel substantially co-extensive with the elongate body with an opening an the opposite end of the body;
   (4) reducing the expanded second end and thereby reducing inside diameter of the channel in proximity of the opposite end for forming an entry of the channel;
   (5) filing a liquid into the channel through the entry and then sealing the entry:
   (6) placing the crank billet with the liquid filled in the channel into a mold and performing a mold forging operation to obtain a semi-product; and
   (7) forming a hole in the body to release the filling liquid out of the channel of the crank.

* * * * *